United States Patent
Scanlan

(10) Patent No.: US 6,985,850 B1
(45) Date of Patent: Jan. 10, 2006

(54) COMMUNICATION PROCESSING SYSTEM

(75) Inventor: Phillip Lee Scanlan, Brisbane (AU)

(73) Assignee: WorldLingo Automated Translations LLC, Las Vegas, NV (US)

( * ) Notice: Subject to any disclaimer, the term of this patent is extended or adjusted under 35 U.S.C. 154(b) by 0 days.

(21) Appl. No.: 09/394,968

(22) Filed: Sep. 10, 1999

(30) Foreign Application Priority Data

Jul. 5, 1999 (AU) ..................... PQ1419

(51) Int. Cl.
G06F 17/28 (2006.01)
(52) U.S. Cl. ................ 704/2; 704/3; 704/7; 704/8; 704/9
(58) Field of Classification Search ........... 704/2–7, 704/200, 201, 203, 8
See application file for complete search history.

(56) References Cited

U.S. PATENT DOCUMENTS

| | | | | |
|---|---|---|---|---|
| 4,599,612 A | * | 7/1986 | Kaji et al. ............... | 704/3 |
| 5,075,850 A | * | 12/1991 | Asahioka et al. ........ | 704/2 |
| 5,268,839 A | * | 12/1993 | Kaji ........................ | 704/3 |
| 5,349,368 A | * | 9/1994 | Takeda et al. ........... | 704/3 |
| 5,568,383 A | * | 10/1996 | Johnson et al. ......... | 704/2 |
| 5,608,622 A | * | 3/1997 | Church .................... | 704/2 |
| 5,701,497 A | * | 12/1997 | Yamauchi et al. ...... | 704/3 |
| 5,828,990 A | * | 10/1998 | Nishino et al. ......... | 904/3 |
| 5,884,246 A | | 3/1999 | Boucher et al. ......... | 704/2 |
| 6,347,316 B1 | * | 2/2002 | Redpath ................. | 704/2 |

FOREIGN PATENT DOCUMENTS

| | | |
|---|---|---|
| JP | 5120335 | 5/1993 |
| JP | 10330316 | 12/1997 |
| JP | 10021241 | 1/1998 |
| JP | 10123516 | 5/1998 |
| JP | 10149359 | 6/1998 |
| JP | 10149363 | 6/1998 |
| JP | 10171810 | 6/1998 |
| JP | 10222513 | 8/1998 |
| JP | 10269223 | 10/1998 |
| JP | 10269285 | * 10/1998 |
| JP | 10326277 | 12/1998 |

OTHER PUBLICATIONS

Globalink: "Globalink Links Up On-Line Professional Translation Server to Users Desktops" 1995.*

* cited by examiner

Primary Examiner—Richemond Dorvil
Assistant Examiner—Lamont Spooner
(74) Attorney, Agent, or Firm—Madson & Metcalf

(57) ABSTRACT

A method and apparatus are described for automatic processing of electronic communications in a networked computer environment. The invention facilitates the appropriate form of translation of the communication to suit the circumstance. The communication is identified as a foreign language communication, a quotation program is optionally applied to calculate the cost of a human translation and a machine translation program is optionally applied to the foreign language communication. The communication, optional quotation and optional machine translation are forwarded to a recipient. The method is transparent to the sender and receiver.

9 Claims, 6 Drawing Sheets

COMMUNICATION PROCESSING SYSTEM

This invention relates to a system for automatic processing of foreign language communication made over a network, such as electronic mail. In particular, it relates to a system that identifies that a translation of the communication is required and the type of translation required. The system may also apply the translation automatically.

BACKGROUND TO THE INVENTION

The Internet has become a truly global medium for communication and commerce. A person can access the Internet from virtually anywhere in the world providing they have access to, at least, a personal computer and a communication network. The networks are conventionally provided by cable, such as telephone connections, although wireless networks are developing. The advent of the World Wide Web (the Web) has extended the Internet to a low cost, global, broadcast medium. A superficial surf of the Web identifies a vast array of web sites in almost every language on the planet.

Although the Web has opened opportunities for electronic commerce and communication, it has not overcome the barrier of language. A business offering products for sale over the Internet is faced with the difficulty of a significant proportion of the potential market using a foreign language. Although many people speak English as a second language, there can be problems caused by non-English speakers misunderstanding the message presented on a web page.

One way of overcoming the aforementioned problem is to provide mirror sites in a range of common languages. While this incurs a cost overhead, it is economic compared to the cost of lost sales from lack of understanding of a product offering.

Web pages in multiple languages can overcome the problem of offering a product or service for sale, but it does not solve the problem of communication, such as negotiating the sale. Many web pages encourage a purchaser to email the owner of the web page to seek information or make purchases. If the native language of the purchaser is different from the seller, the language barrier may again lead to a lost sale.

The language barrier in email is also faced by multinational corporations. Email is fast becoming the most common form of medium security corporate communication. However, significant problems are encountered if the email is not in the native language of the recipient. The recipient is faced with the options of either trying to glean a meaning from a few recognised words or facing a delay, and potentially significant cost, while an accurate translation is made. The speed and convenience of email is lost if the email needs to be translated before it can be read.

A solution to aspects of the problem described above has been proposed by Boucher et al in U.S. Pat. No. 5,884,246. In the Boucher approach the address of a translation site is concatenated onto the destination address of the communication so that the communication is delivered to the translation site. The communication is translated at the translation site and the translated communication is forwarded to the recipient at the destination address. The Boucher approach has three problems. Firstly, it is not transparent to the sender which may be a significant barrier in an electronic commerce environment. Secondly, it is language specific for each communication because the sender specifies the translation site rather than the recipient selecting a desired translation. Thirdly, the Boucher approach fails if no suitable electronic translation is available.

Numerous approaches to making electronic translations of documents exist in the prior art. For instance, Japanese patent application number 8-146848 describes a translation method that applies "fuzzy inference" using a vocabulary dictionary, a grammar dictionary and a semantic dictionary that form a knowledge base. And Japanese patent application number 8-173478 describes a machine translation method that uses an intermediate code as a common gateway for all translations. Communications are translated into the common code before transmission and then to a desired language after transmission. Neither patent describes a translation method with sufficient flexibility for modern communication.

Reference may also be had to Japanese patent application number JP 9-72224 in the name of Toshiba Co Ltd. This patent describes a conventional machine translation system but with the additional feature of allowing the user to request retranslating of the communication if the user is dissatisfied with the accuracy of the first translation. The Toshiba approach requires the user to redefine the parameters used to perform the machine translation. Although Toshiba makes the retranslation request easier, it does not make the processing of the translation automatic. Rather, the user must have sufficient technical understanding to modify the translation parameters.

None of the known prior art translation systems offer flexibility and transparency in translating electronic communications.

OBJECT OF THE INVENTION

It is an object of the invention to provide a system for automatic processing of electronic communication.

Other objects will be evident from the following discussion.

SUMMARY OF THE INVENTION

In one form, although it need not be the only, or indeed the broadest form, the invention resides in a method for automatic processing of electronic communication including the steps of:

sending a communication from a sender in a first language;

identifying the communication as a foreign language communication;

determining if a translation of the communication to a second language is required by the recipient;

applying a translation program to the communication to generate a machine translation if a translation of the communication to the second language is required by a recipient;

determining if a human translation of the communication to the second language may be required by the recipient;

applying a quotation program to the communication to generate a quotation for the human translation if a human translation of the communication to a second language may be required by the recipient; and forwarding the communication and, if required, the machine translation and, if required, the quotation to the recipient.

In a further form, the method includes the steps of:

the recipient formulating a response to the communication;

identifying the response as a native language response to the foreign language communication;

if required by the sender, applying a machine translation program to the native language response to generate a foreign language response;

if a machine translation is not suitable, applying a human translation to the native language response to generate a foreign language response; and forwarding the foreign language response to the sender.

In a further form the method includes the steps of:

the recipient formulating a response to the communication;

identifying the response as a native language response to the foreign language communication;

determining if a machine translation of the native language response to generate a foreign language response is required by the sender;

applying a machine translation program to the native language response to generate a foreign language response if required by the sender;

determining if a human translation of the native language response to generate a foreign language response may be required by the sender;

if a human translation of the native language response to generate a foreign language response may be required by the sender, applying a quotation program to the native language response to generate a quotation for the human translation; and forwarding the foreign language response and, if required, the quotation, to the sender.

In preference the sender directs communication to an email address of the recipient from a foreign language web page of the recipient and a mail server identifies that the communication has come from the foreign language web page and is therefore likely to be in a foreign language.

The translation program is suitably resident on a translation server although it could be resident on some other server.

The communication, machine translation and quotation are preferably sent to the recipient by email although they could be stored at a web site for access by the recipient. In the later case it would be convenient to control access to a users email with suitable security protocols.

In a yet further form, the invention resides in a system for automatic processing of a foreign language communication, the system comprising:

first means for sending a communication over a communications network;

second means for receiving said communication and identifying said communication as a foreign language communication;

third means for generating a quotation for human translation of said foreign language communication to a native language;

fourth means for generating a machine translation of the foreign language communication to the native language;

fifth means for forwarding said communication, said machine translation and said quotation to an intended recipient; and sixth means for said intended recipient to receive said communication, said machine translation and said quotation.

Suitably the means for sending and receiving the communication are personal computers. The remaining means are suitably network server computers.

There may be a single server performing all functions or multiple servers, each performing one or more functions.

BRIEF DESCRIPTION OF THE DRAWINGS

Preferred embodiments of the invention are described with reference to the following figures in which.

DETAILED DESCRIPTION OF THE PREFFERED EMBODIMENT

For ease of explanation, the preferred embodiment is explained in terms of email. It will be appreciated that the translation system is not limited to email but is applicable to any form of electronic communication across a network.

Figure 1:
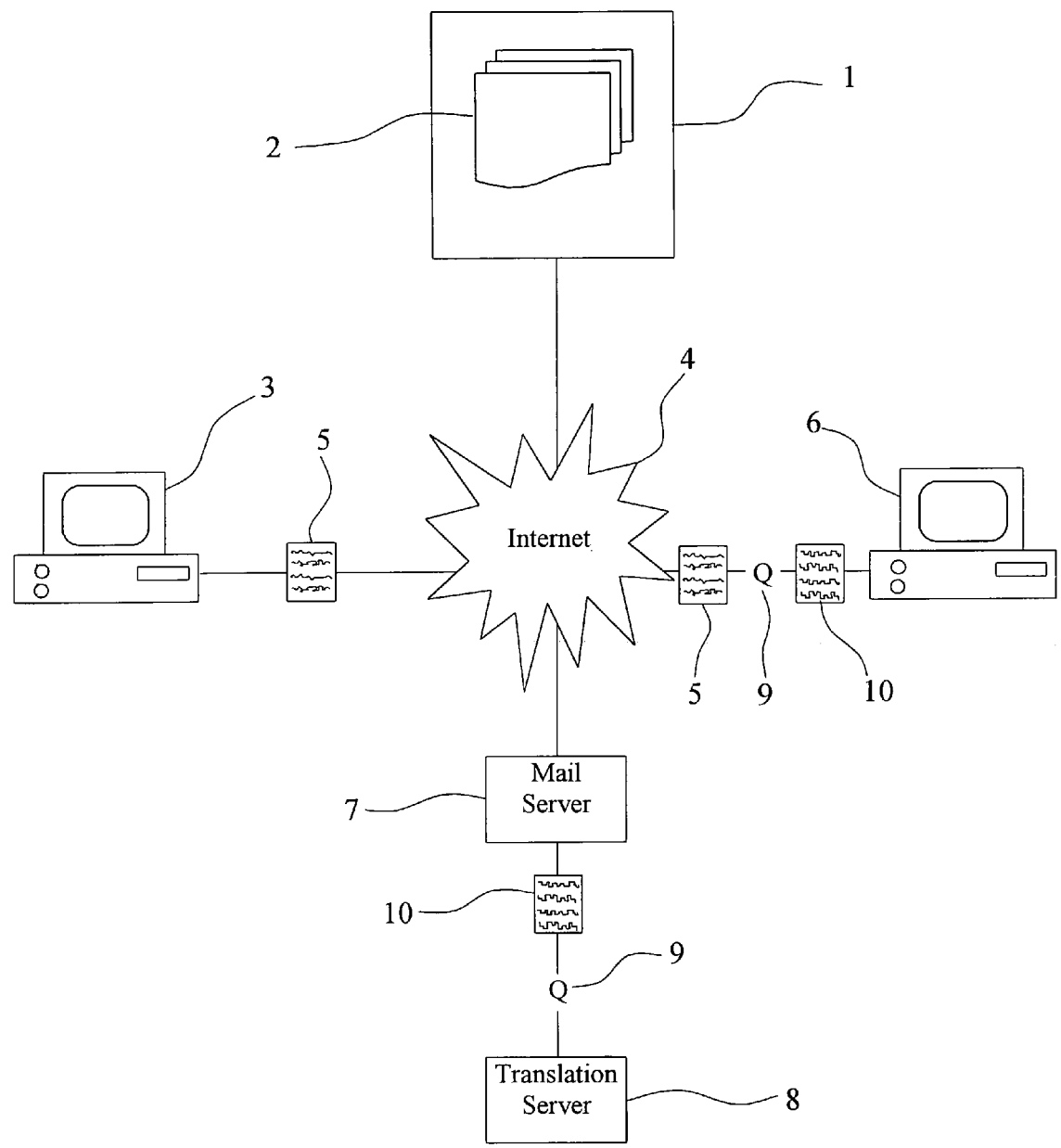
FIG. 1 is a schematic of a first embodiment of the invention.

Referring to FIG. 1 there is shown a block schematic of the elements of an automatic processing system for electronic communications that may require translation. A person trading or communicating over the Internet has, for example, a web site resident on a web server 1. The person has the web pages of the web site translated to a number of foreign languages to produce foreign language web pages 2. These pages may be resident on the same server, a number of different servers, or on a number of mirror sites.

A sender (purchaser in a commerce situation) 3 accesses the web pages 2 through the Internet 4. The web pages have an email address useable by the sender 3 to send a communication 5 to a recipient (seller in the commerce situation) 6. The recipient 6 will normally be the owner of the web pages 2. Also connected to the Internet is a mail server 7 that processes communications 5 between the sender 3 and recipient 6. The mail server 7 may intercept the communication 5 or may receive the communication directly.

The mail server 7 analyses the communication 5 and passes the communication to a translation server 8 for translation, if required. The translation server 8 generates and returns a quotation 9 for human translation and optionally produces a machine translated communication 10. The mail server 7 forwards the communication 5, the quotation 9, and the machine translated communication 10, if it exists, to the recipient 6.

The mail server may intercept the communication by analysing the email address. Alternatively, the communication may have been sent directly to the mail server or autoforwarded from some other mail server that performed a preliminary analysis.

Although FIG. 1 shows the mail server 7 and translation server 8 as separate items, it will be appreciated that both functions can be provided on a single computer. Similarly, the quotation for human translation can be generated at the mail server or the translation server or a separate quotation server.

A web page is only one example of a means of initiating an electronic communication. A person may print a different business card for each country in which they do business. Each card could have a different email address so that communication from the recipient of the card is automatically directed to the translation server for translation. Similarly, email addresses can be included on fliers, brochures, catalogues, CDs, lists, in newsgroups, listservs, etc.

The system is not limited to processing email communications but can be applied to any electronic communication transmitted across an internet, intranet or extranet. For example, the system can be employed with a media clipping service to process foreign language news items. The system may also be employed when researching text based documents held in foreign language electronic libraries.

Figure 2:
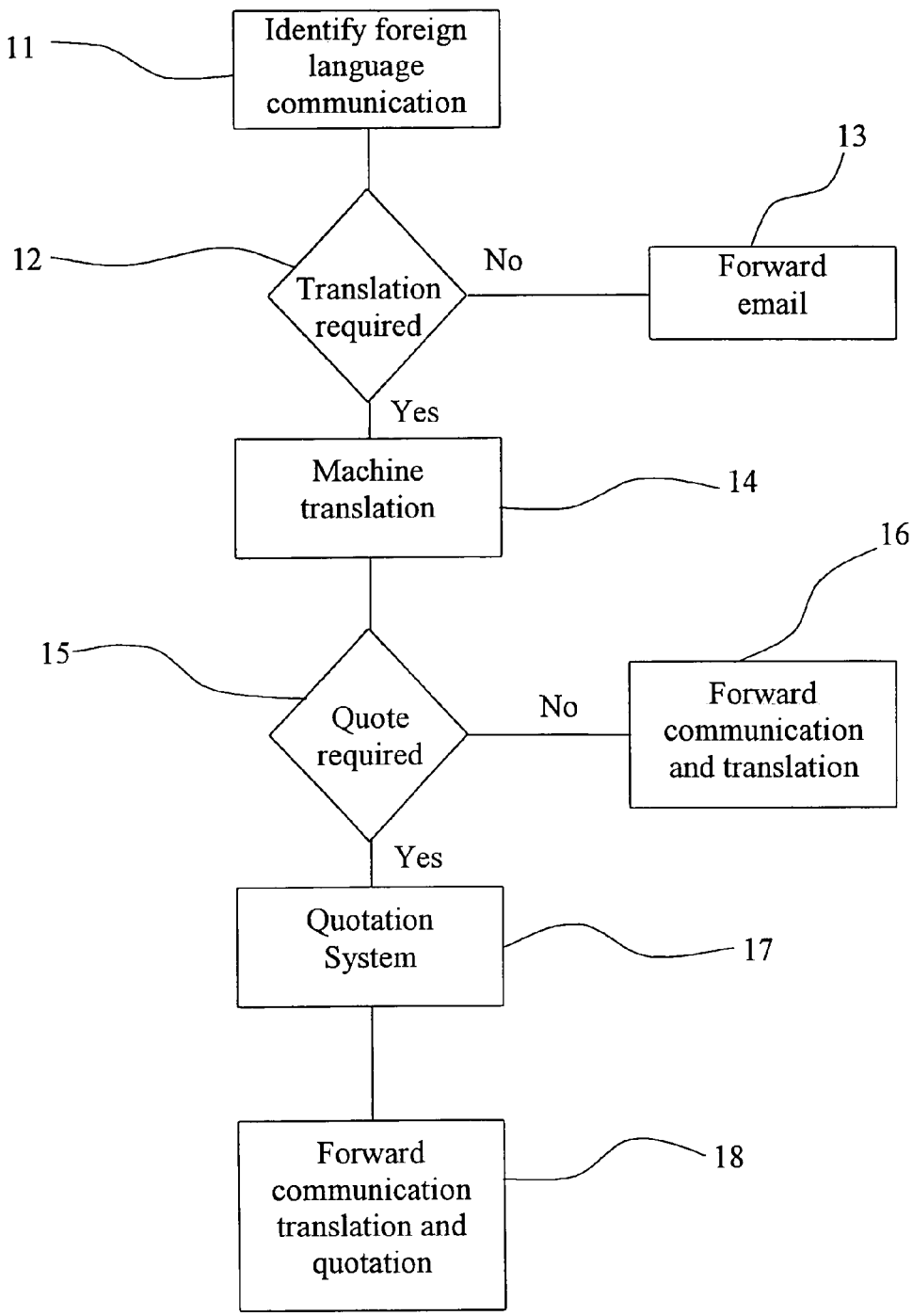
FIG. 2 is a flow chart of an automatic communication processing system.

Referring to the flow chart of FIG. 2, the first step 11 is to identify the foreign language communication. The process is initiated when a sender 3 sends communication 5 to the recipient 6. The mail server 7 receives the communication 5 and determines if translation is required 12. This can be achieved by any suitable method. In one embodiment, each foreign language web site is allocated a specific email address that identifies the language of the sender. For example, the email address of the recipient may jb@myco.com and the email address at the Spanish language site may be jb.spanish.myco@worldlingo.com or similar. Additional information for defining the required translation can also be included in the email address. For example, a communication in Spanish relating to medical issues could be directed to jb.spanish.myco@worldlingo.com.

Alternatively, all email addresses may be the same and the mail server 7 may parse all communications for foreign language identifiers. Suitable identifiers can include common words or symbol combinations. The originating site could automatically insert a unique identify to indicate the language of the originating system. Other identification methods will be evident to persons skilled in the art, such as those described in Japanese patent application number 8-279664, in the name of Sharp Co Ltd and Japanese patent application number 3-282748, in the name of Toshiba Co Ltd.

It will be appreciated that the identification process is applicable to other forms of communication than merely email. As mentioned above, a user may receive electronic copies of news articles from a clipping service. If some of these articles are in a foreign language they can be automatically identified and forwarded to the next phase of the translation system. The communication can be in virtually any form including sound, video, animation, sign language, etc.

Once a foreign language communication has been identified, the filter 12 determines if translation is required. Some recipients may only require translation of some languages. For example, a recipient may be fluent in English and German and therefore not require translation of these languages. If translation is not required the communication is forwarded 13 directly to the recipient 6.

If translation is required a machine translation 14 is performed, if a suitable program is available. Any suitable machine translation program can be used, such as one of those identified in the prior art. The inventor envisages that a range of translation programs will be stored on the translation server 8 or a number of dispersed translation servers. An expert system may be employed to "learn" the best translator for a class of communications.

The inventor envisages that there may be multiple translation servers. For example, the best site for translating Japanese scientific papers may be at Tokyo University. The translation system would forward the communication to the Tokyo translation site for translation of scientific papers in Japanese. Popular translators could be mirrored in a number of countries.

In most cases a quotation 9 for human translation is determined. However, in some cases, a recipient 6 may not require a quote for a human translation. A filter 15 checks for situations in which a quote for human translation is not required. This may be according to standard instructions by some recipients. In some cases the available machine translation may be of very high integrity, thereby rendering human translation redundant. Even when good machine translation programs are available, a human translation may be required for sensitive communications. If a quotation 9 is not required, the original communication 5 and the machine translation 11 are forwarded 16 to the recipient 6.

The inventor envisages that an expert system could be employed to "learn" the situations in which a given recipient requires human translation. For example, the recipient could define keywords such as, order, sale, a name, etc that would automatically be human translated. Alternatively, communications including the keyword receive priority processing with the quotation including highlighting of the presence of the key words.

User preferences for translation parameters can be stored in a recipients preference file maintained on the mail server or the translation server.

A quotation 9 is calculated by quotation system 17. In one embodiment this is an automated system that calculates a quotation based on parameters such as the language, number of words, urgency and complexity. Alternatively, a human translator can prepare a quotation manually. The quotation system is explained in more detail below with reference to FIG. 5.

The foreign language communication 5, machine translation 11 and quotation 9 are forwarded 18 to the recipient 6. This may occur by email to the recipient or alternatively, the material may be stored at a secure web site accessible by the recipient. In the latter case, suitable security protocols are employed.

Figure 3:
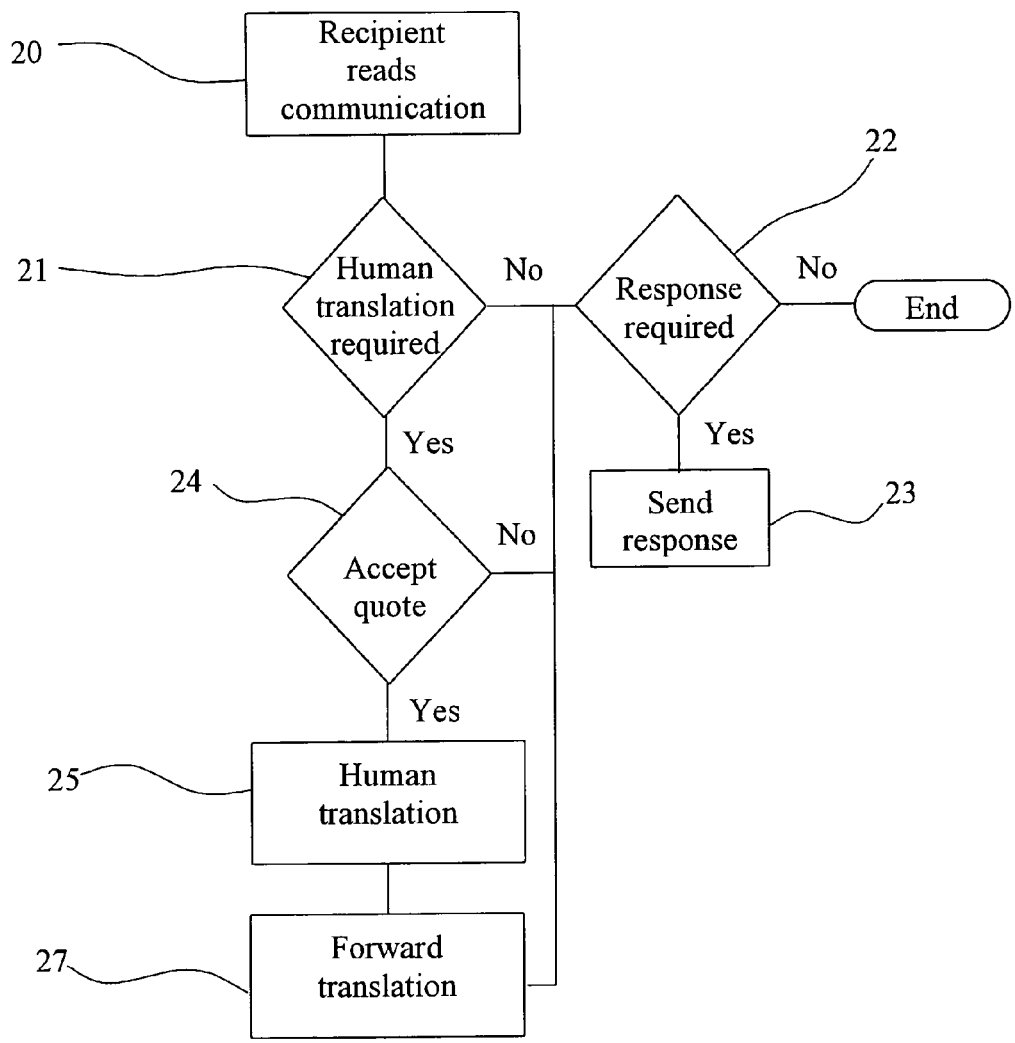
FIG. 3 is a flow chart of a human translation option.

The system from the point of view of the recipient is as shown in FIG. 3. The process is initiated 20 when the recipient reads the machine translation 10. The recipient decides 21 if a human translation is required.

If the machine translation is decipherable a human translation will not be required and the recipient will decide 22 if a response is required. If no response is required the system terminates. If a response is required the recipient prepares and sends a response 23. Handling of the response is described below with reference to FIG. 4.

The recipient may decide that a human translation is required and consider 24 the provided quotation 9. If no quote has been provided the recipient can request a quote from the quotation system 17. If the quote is not accepted the recipient proceeds to decide if a response is required based on the information at hand. If it is accepted the communication is passed to a human translator 25 and the translation is prepared and forwarded 27 to the recipient 6 to determine if a response is required.

Figure 4:
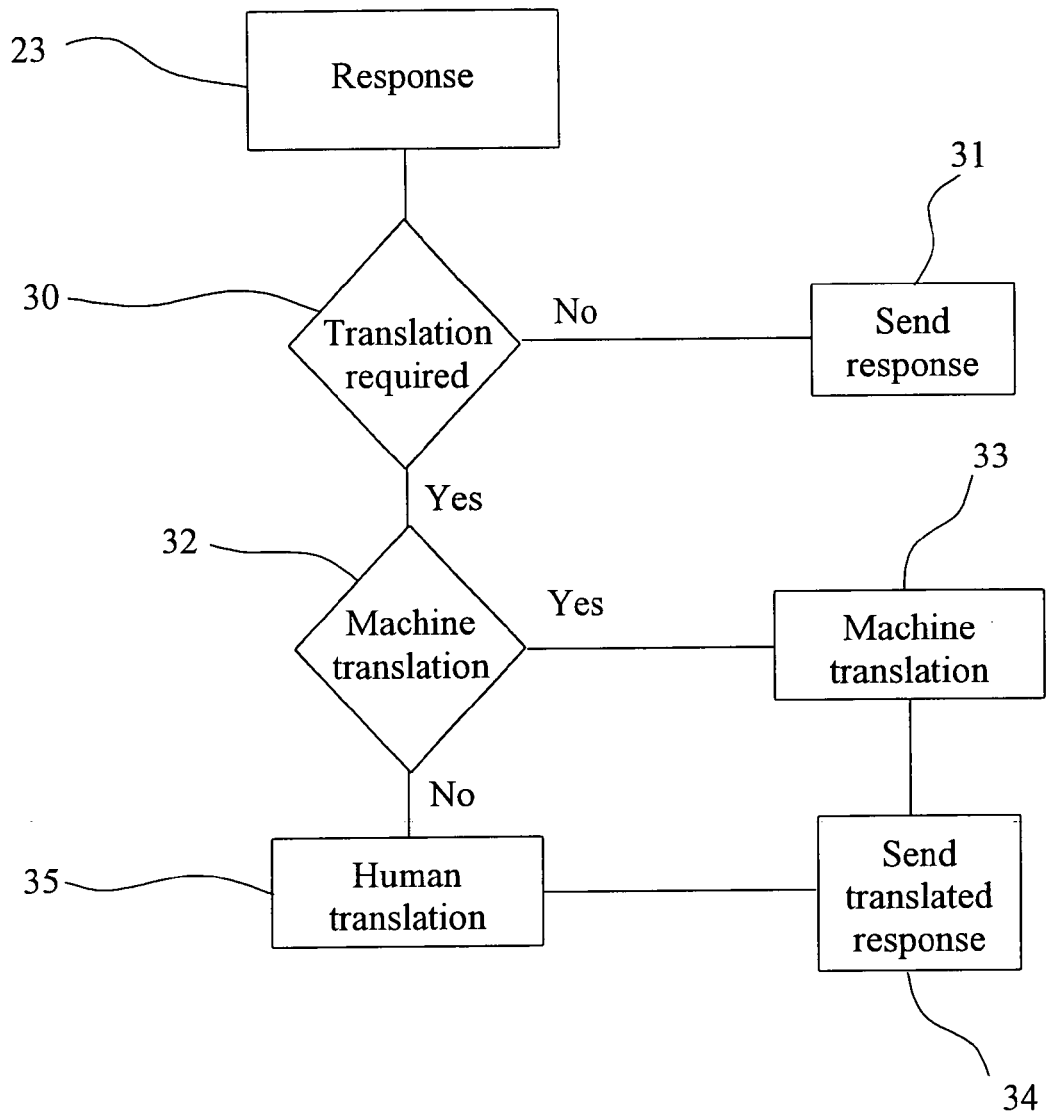
FIG. 4 is a flow chart of a communication sending system.

The system works in reverse to translate the response 23 of the recipient 6, as shown by the flow chart of FIG. 4. The response is intercepted by the mail server 7 and the response is analysed 30 in the manner described above to determine if translation is required. If no translation is required the response is simply forwarded 31 to the sender 3. This will occur if, for example, the recipient has responded in the native language of the sender or a standard response from a library of responses is used.

If a translation is required the response is passed to the translation server 8 to determine 32 if a machine translation is possible. If machine translation is suitable the response is translated 33 and the translated response is sent 34. If machine translation is not suitable, the response is passed to a human translator 35 for translation. The translated response is then forwarded 34.

It will be appreciated that the system described above is transparent to the sender 3. This is important in an electronic commerce environment to minimise barriers to a foreign language customer making a purchase from a web site. The sender (purchaser) may make an order or request information in their native language. The system processes the electronic communication to provide the recipient (seller) with a machine translation and an opportunity to accept a human translation. The seller's response is automatically translated to the native language of the purchaser, either by machine translation or a human translation.

In some cases, it may be acceptable for the translation of the response from the recipient to be at the cost of the sender. In this case the process follows the flow chart of FIG. 2 as if the response were an original communication.

Figure 5:
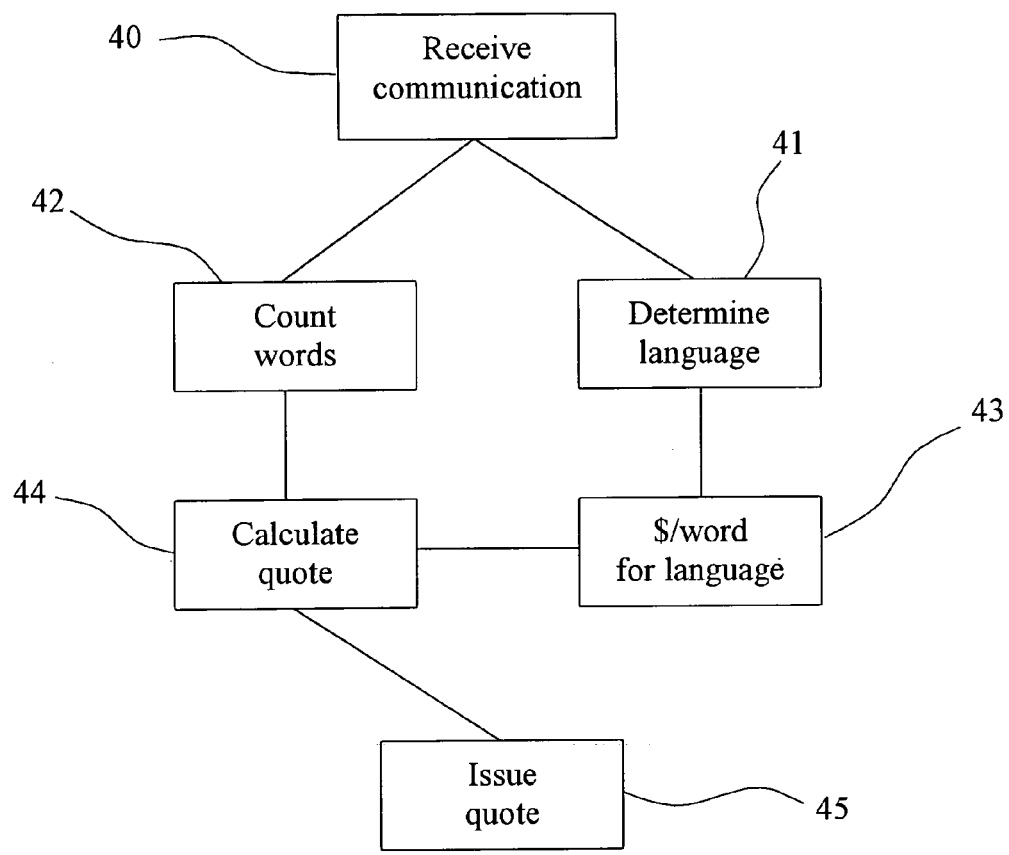
FIG. 5 is a flow chart of the quotation system.

Referring now to FIG. 5, the flow chart sets out the steps in the quotation system 17. When an electronic communication is received 40 the language of the communication is determined 41 and a word count 42 is made. The language can be determined by any suitable method, such as: information in the subject line of an email; searching for key words or symbols; using third party identification programs; autosensing; the email address of the originating site; account information maintained for the user; human analysis, etc.

Once the language is determined the translation cost per word or phrase can be calculated 43. The cost may be a flat rate for the identified language. However, it is more likely that a number of factors may modify the cost. These factors may include: the required translation quality; the existence of a glossary of translated terms; the complexity of the subject matter; the existence of a translation memory storing previously translated sentences and paragraphs.

The quotation is calculated 44 as the number of words times the cost per word:

$$Q = words \times \$/word$$

and then issued 45.

Figure 6:
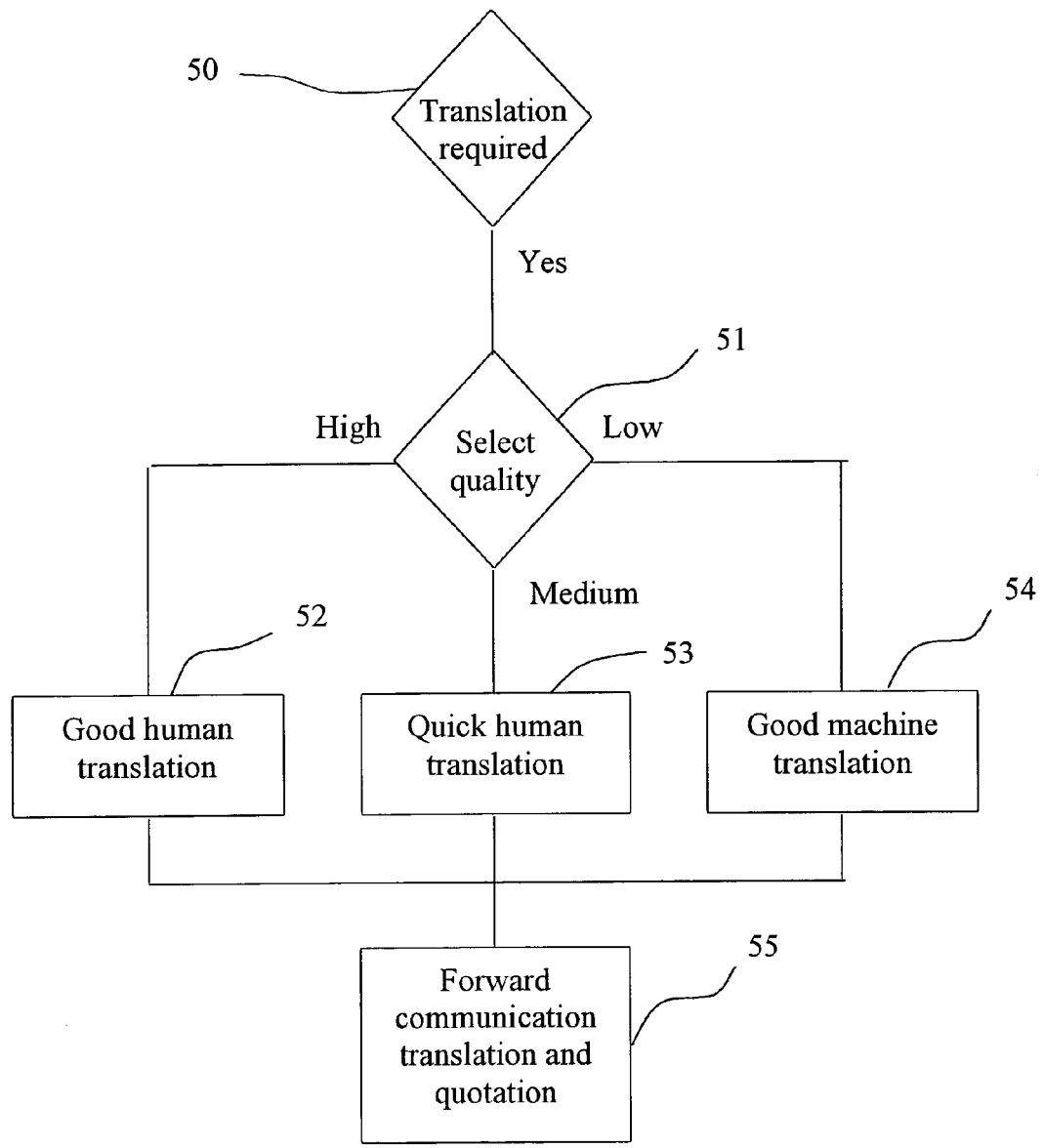
FIG. 6 is a flow chart of a quality selection system.

The system described above may employ a variety of machine translators and human translators. The available translators will produce translations of varying quality. The inventor envisages that different standard translations will be suitable for different situations. A method for selecting the appropriate quality standard to suit the situation is depicted in FIG. 6.

When a translation is required 50, the quality of required translation is decided 51. The decision may be automatic based on user preferences or it may be a manual selection available at the time of receipt of a quotation. For example, in the flow chart of FIG. 2, a free machine translation of low quality may be provided along with a quotation for providing translations of varying standards of quality and cost.

Once the translation quality standard is selected 51 the communication is directed to a translator that may be a good human translation 52, a quick human translation 53 or a good machine translation 54. Other levels of quality can easily be incorporated into the method. The original communication and translation are forwarded 55.

The system can also incorporate appropriate security protocols to suit the nature of the communication being translated. The security level may be determined according to user preferences or may be selectable in a similar manner to that described for selecting the quality of translation. Various security protocols will be known to persons skilled in the art and can be easily incorporated.

Although the above discussion has focussed on communication across the Internet, it will be appreciated that the system can equally be implemented on an intranet of a multinational corporation. An advantage of the system is that recipients are able to sort relevant communication from less relevant communication by receiving a timely translation. The system also facilitates timely human translation of more important communication messages.

As mentioned above, the invention is not limited to electronic communications in the form of Email. Any form of electronic communication can be translated using the methods described. There is advantage in compiling databases of translated documents that may be requested by other users. For example, a foreign language patent specification may be translated when it is requested from a document provider in an English speaking country. Once translated the specification can be stored in a database and supplied to the next requester.

Throughout the specification the aim has been to describe the invention without limiting the invention to any specific combination of features.

I claim:

1. A system for automatic processing of a foreign language communication, the system comprising:
   first means for sending a communication over a communications network;
   second means for receiving said communication and identifying said communication as a foreign language communication;
   third computer-implemented means for generating a quotation for human translation of said foreign language communication to a native language;
   fourth means for generating a machine translation of the foreign language communication to the native language;
   fifth means for forwarding said communication, said machine translation and said quotation to an intended recipient; and
   sixth means for said intended recipient to receive said communication, said machine translation and said quotation;
   wherein the fifth means forwards the communication, the machine translation and the quotation substantially simultaneously.

2. The system of claim 1 wherein the first and sixth means are personal computers.

3. The system of claim 1 wherein said second and fifth means is a network server computer configured as a mail server.

4. The system of claim 1 wherein said third means is a computer configured as a quotation server.

5. The system of claim 1 wherein said second, third, fourth and fifth means is a single network server computer.

6. The system of claim 1 wherein the first and sixth means are the same personal computer.

7. A method for automatic processing of electronic communication including the steps of:
   sending a communication from a sender in a first language;
   identifying the communication as a foreign language communication;
   in response to one or more previously provided instructions by a recipient, automatically applying a translation program to the communication to generate a machine translation of the communication to a second language;

in response to one or more previously provided instructions by a recipient, automatically applying a quotation program to the communication to generate a quotation for a human translation of the communication to the second language; and automatically forwarding the communication and the machine translation and the quotation to the recipient;

wherein the communication and the machine translation and the quotation are forwarded substantially simultaneously to the recipient.

8. A method for automatic processing of electronic communication including the steps of:

sending a communication from a sender in a first language;

identifying the communication as a foreign language communication;

automatically applying a translation program to the communication to generate a machine translation;

automatically applying a quotation program to the communication to generate a quotation for a human translation; and automatically forwarding the communication, the machine translation, and the quotation to a recipient;

wherein the communication, the machine translation, and the quotation are forwarded substantially simultaneously to the recipient.

9. The method of claim 8, further comprising the steps of:

performing a human translation of certain keywords contained in the communication, wherein the keywords are predefined by the recipient; and forwarding the human translation of the keywords to the recipient substantially simultaneously with the communication, the machine translation and the quotation.

* * * * *